(12) United States Patent
Hardacker

(10) Patent No.: US 8,275,315 B2
(45) Date of Patent: Sep. 25, 2012

(54) SYSTEM AND METHOD FOR TRANSMITTING DATA OVER AN AUDIO COMMUNICATION LINK

(75) Inventor: Robert Hardacker, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 442 days.

(21) Appl. No.: 12/588,373

(22) Filed: Oct. 14, 2009

(65) Prior Publication Data

US 2011/0086593 A1 Apr. 14, 2011

(51) Int. Cl.
*H04B 7/00* (2006.01)
(52) U.S. Cl. .......................... 455/41.2; 700/94
(58) Field of Classification Search ................. 455/41.3, 455/41.1–41.2; 370/297; 700/94
See application file for complete search history.

(56) References Cited

U.S. PATENT DOCUMENTS

| | | | | |
|---|---|---|---|---|
| 7,010,290 | B2* | 3/2006 | Dent | 455/414.1 |
| 2005/0215200 | A1* | 9/2005 | Oesterling | 455/66.1 |
| 2008/0233876 | A1* | 9/2008 | Marholev | 455/41.2 |
| 2010/0208631 | A1* | 8/2010 | Zhang et al. | 370/297 |
| 2010/0227584 | A1* | 9/2010 | Hong | 455/404.1 |

FOREIGN PATENT DOCUMENTS

WO WO-2008/153651 A1 12/2008

OTHER PUBLICATIONS

Lynch, Denard et al., In-Building Data-Over-Voice Internet Access, IEEE Xplore, 2002, pp. 1418-1423.*
Tschida, Tyler Jan. 27, 2009, "Bluetooth File Transfer Made Possible" http://appadvice.com/appnn/2009/01bluetooth-file-transfer -made-possible/.
Mallen, Catt, Apr. 23, 2009, "What are the Pros of Bluetooth Technology?" http://www.iphoneinsurance-uk.co.uk/114what-are-the pros-of -bluetooth-technology.

* cited by examiner

*Primary Examiner* — Nay A Maung
*Assistant Examiner* — Angelica Perez
(74) *Attorney, Agent, or Firm* — Haverstock & Owens LLP

(57) ABSTRACT

The present invention relates to a system and method that allows a user to transfer digital data to and from a mobile device between two or more communication devices, in cases where the communication between the devices is restricted or otherwise limited to audio or audio tone transmissions. Transmitting digital data over such an audio communication link may include establishing a wireless, short-range communication link, converting a digital data set to an audio tone sequence, converting the audio tone sequence to a digitized audio signal, transmitting the digitized audio signal from a first device to a second device over the communication link, converting the digitized audio signal back to the audio tone sequence, and converting the audio tone sequence back to the digital data set.

22 Claims, 7 Drawing Sheets

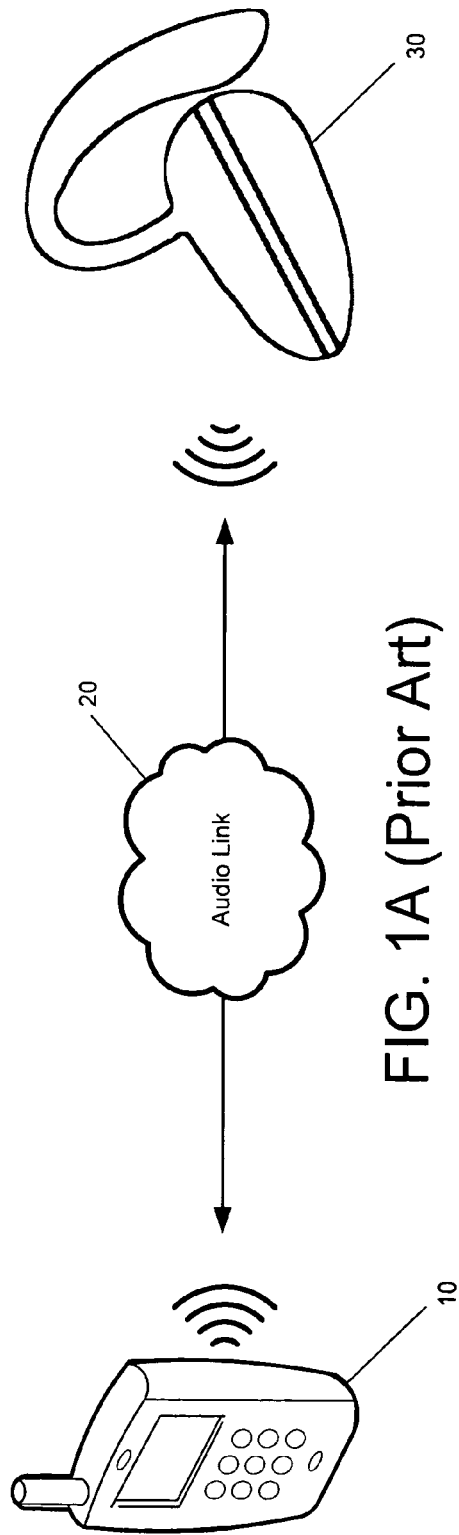
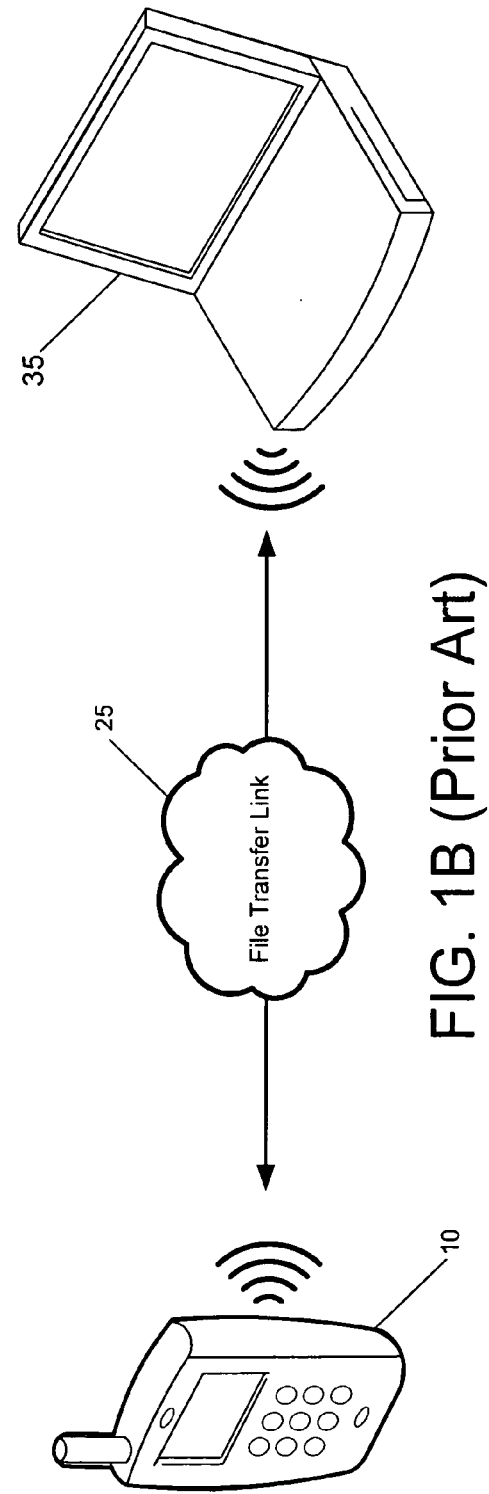

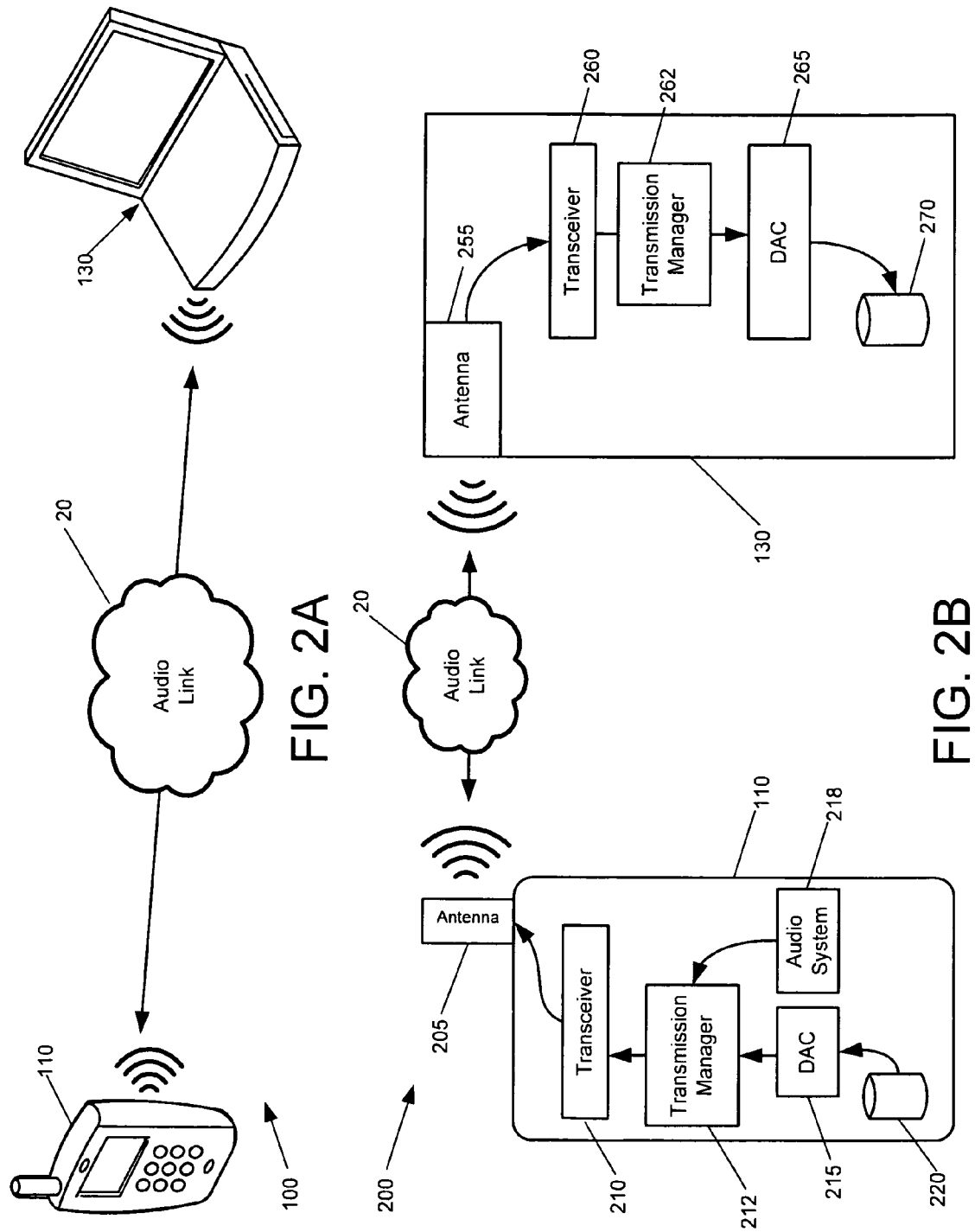

SYSTEM AND METHOD FOR TRANSMITTING DATA OVER AN AUDIO COMMUNICATION LINK

BACKGROUND OF THE INVENTION

1. Field of the Invention

This invention relates generally to the transmission of data between devices having a limited short-range audio communication link and, particularly, to a system and method for transmitting data over an audio communication link using audio tones.

2. Description of the Related Art

Modern mobile phones offer advanced capabilities, often with PC-like functionality. Such mobile devices often include powerful processors, abundant memory, large screens and complex operating systems. In many cases, these mobile devices include various applications and store considerable user data. Users often find themselves needing to transfer information to and from these mobile devices to other nearby devices, such as laptops, personal computers, other mobile devices, etc.

Many mobile devices employ Bluetooth technology to communicate with nearby devices. Bluetooth is a wireless telecommunications technology that provides an open standard for short-range wireless transmission of digital voice and data between mobile devices, such as laptops, personal digital assistants (PDAs), phones, desktop devices, etc. Each Bluetooth-enabled device includes a radio transceiver and operates in a globally-available frequency band. Furthermore, use of the Bluetooth technology can be limited by the mobile device provider to specific categories of use called profiles.

FIGS. 1A and 1B illustrate two examples of how Bluetooth communications may be used to enable communication between a mobile device and another device.

In FIG. 1A, mobile device 10 communicates with a Bluetooth enabled ear piece 30 over an audio link 20. In order to use Bluetooth technology, a device must be compatible with certain Bluetooth profiles, which define the possible applications for the technology. For example, different Bluetooth profiles exist for wireless communication between a mobile phone and a hands-free headset, wireless communication with PC input and output devices (e.g., mouse and keyboard), wireless communication for data transfer, etc. Accordingly, in FIG. 1A, audio link 20 between mobile device 10 and wireless ear piece 30 uses a Bluetooth profile for wireless communication between a mobile phone and a hands-free headset. This Bluetooth profile is limited to the transmission of audio tones. In addition, the mobile device 10 may be further limited to the uses set forth by a service provider associated with the mobile device or manufacturer of the mobile device.

In FIG. 1B, mobile device 10 communicates with a Bluetooth enabled laptop 35 over a file transfer link 25. In this example, file transfer link 25, between mobile device 10 and laptop 35, uses the Bluetooth profile for wireless file transfer. This profile provides for digital data transfer, but not for transferring audio streams.

While Bluetooth has certain advantages over cellular networks with respect to short-range communication, many cellular service providers limit the use of their Bluetooth enabled devices to specific profiles or limited specific uses within profiles. This forces subscribers to pay for wireless data plans or pay for data transfer on a per MB basis. For example, the current iPhone™, manufactured by Apple™, may have Bluetooth technology limited to audio-only communications. Accordingly, users may be unable to transfer data using the Bluetooth communication link except via a cellular network.

FIG. 1C illustrates an example of a communication path between mobile device 10 and laptop 35 via the cellular network in the absence of an available Bluetooth profile for data transfer. In FIG. 1C, data from the mobile device 10 must travel over cellular interface 50 to a nearby cellular tower 55. From cellular tower 55, the data must reach and be processed by the service provider 60, which then communicates the data over the interne 70 to laptop 35. As such, users of mobile devices may be unable to transfer data between their mobile devices and other nearby devices without transmitting the data through the cellular service provider, thereby incurring data transfer charges or paying for expensive data plans. Furthermore, in the case where a cellular signal is weak or absent, users of mobile devices may be completely unable to transfer data between their mobile devices and other nearby devices.

Consequently, there is a need for a method and system that would allow a user to transfer data to and from a mobile device using a Bluetooth technology, in cases where the Bluetooth technology is restricted or otherwise limited to audio tone transmissions.

SUMMARY OF THE INVENTION

The present invention provides a system and method that allows a given user to transfer data to and from a mobile device to another device using a short-range audio communication link. For example, the mobile device may communicate with another device using Bluetooth communication technology in cases where the Bluetooth technology is restricted or otherwise limited to audio or audio tone transmissions.

An example embodiment of the present invention may include a method for transmitting digital data over an audio communication link. The method may include establishing an audio communication link, converting a digital data set to an audio tone sequence, converting the audio tone sequence to a digitized audio signal, transmitting the digitized audio signal from a first communication device to a second communication device over the audio communication link, converting the digitized audio signal to the audio tone sequence, and converting the audio tone sequence to the digital data set.

Another example embodiment of the present invention may include a system for transmitting data over an audio communication link, including a first communication device and a second communication device. The first communication device may include a first data storage medium, a first transceiver, and a first digital-audio data converter. The second communication device may include a second data storage medium, a second transceiver, and a second digital-audio data converter.

The audio communication link may be a wireless, short-range communication link established using the transceivers at both communication devices. These transceivers may be, for example, Bluetooth, infrared, or similar devices capable of communication across a medium. Furthermore, the devices may be limited to the transmission of audio communication across any established communication link. For example, the wireless, short range communication link may be limited or restricted to the transmission of audio data only.

The transceivers may convert audio tone sequences to digitized audio signals and transmit the digitized audio signals from the first communication device to the second communication device over the audio communication link. The transceivers may also convert a received digitized audio signal to an audio tone sequence.

The audio-data converters at each device may convert digital data sets to audio tone sequences, and vice versa. The data sets may be stored and retrieved from storage media in each communication device.

The audio tone sequences may be analog tone sequences. Alternatively, the audio tone sequences may be audio tones that are represented in a digital format. The audio-digital data converters may be bi-directional data converters, capable of converting audio tones to digital data, and vice versa. Furthermore, the communication of data between the first communication device and the second communication device may be bi-directional, allowing data transfer in both directions across the audio link.

BRIEF DESCRIPTION OF THE DRAWINGS

These and other more detailed and specific features of the present invention are more fully disclosed in the following specification, reference being had to the accompanying drawings, in which:

FIG. 1A illustrates a short-range wireless communication between a mobile device and a wireless earpiece via an audio link.

FIG. 1B illustrates a short-range wireless communication between a mobile device and a laptop via a file transfer link.

FIG. 2A illustrates an example embodiment of a communication system including a mobile device and a laptop, in accordance with the present invention.

FIG. 2B illustrates an example embodiment of a communication system, exemplifying the components of a digital data transfer from a mobile device to a laptop via an audio link, in accordance with the present invention.

DETAILED DESCRIPTION OF THE INVENTION

In the following description, for purposes of explanation, numerous details are set forth, such as flowcharts, system configurations, and processing architectures in order to provide an understanding of one or more embodiments of the present invention. However, it is and will be apparent to one skilled in the art that these specific details are not required in order to practice the present invention.

The present invention provides a system and method for transmitting data over an audio communication link using audio tones. The present invention may be embodied in various forms, including business processes, computer implemented methods, computer program products, computer systems and networks, user interfaces, application programming interfaces, and the like.

Figure 1C:
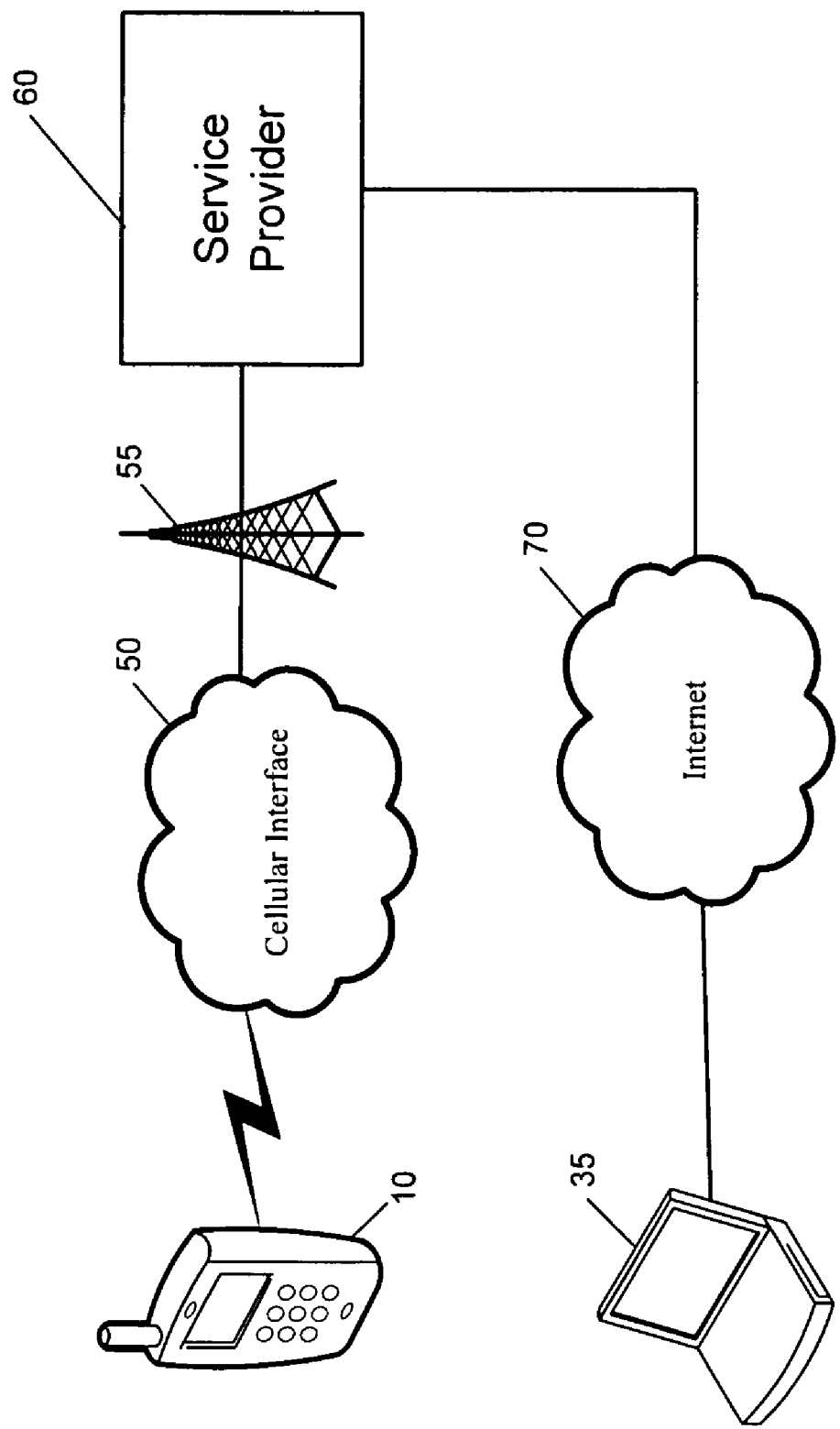
FIG. 1C is an example embodiment of data communication between a mobile device and laptop via a cellular network.

FIG. 2A illustrates an example embodiment of a communication system 100 including a mobile device 110 and a laptop computer 130, in accordance with the present invention. Mobile device 110 and laptop 130 may communicate via audio link 20. Audio link 20 may be a wireless, short range communication link intended for the transmission of audio data only. For example, audio link 20 may be a Bluetooth communication link that is set to an audio profile, such as the Bluetooth profile employed in FIG. 1A. However, unlike FIG. 1A, communication system 100 may transfer digital data using audio link 20. Digital data may include ASCII characters, binary files, or any other digital information. The digital data may be transferred over audio link 20 by converting the digital data into audio tones via a digital-audio data converter ("DAC") and then converting the audio tones to a digitized audio signal. The digitized audio signal may then be transmitted over audio link 20. At laptop 130, the digitized audio signal may be converted back to audio tones. The audio tones may then be converted to digital data via a DAC that converts audio tones to digital data.

While FIG. 2A illustrates a communication system 100, including mobile device 110 and laptop 130, one of ordinary skill will appreciate that the invention is not limited thereto. For example, the present invention may apply to communications between any two or more devices capable of establishing a digital audio link.

FIG. 2B is an example embodiment of a communication system 200, exemplifying a digital data transfer from mobile device 110 to laptop 130, in accordance with the present invention.

Mobile device 110 may include a data storage medium 220, a DAC 215, a transmission manager 212, an audio system 218, a transceiver 210, and an antenna 205. Mobile device 110 may operate in either audio mode, when transmitting audio over audio link 20, or data-over-audio mode, when transmitting digital data over audio link 20. The transmission manager may be a process, processor, or any other mechanism that can monitor and manage the outgoing transmission.

Transmission manager 212 may monitor whether mobile device 110 is operating in audio mode or data-over-audio mode. Alternatively, transmission manager 212 may determine whether mobile device 110 is operating in audio mode or data-over-audio mode.

Audio system 218 may include the common audio components found in a cellular telephone or similar device, including but not limited to, a microphone for capturing audio and a speaker for the playback of received audio transmissions. In one embodiment, audio system 218 may provide an analog audio signal in response to user audio input, such as sound received through a microphone. Alternatively, audio system 218 may employ an audio codec or similar to produce digital audio signals in response to audio input.

When the mobile device 110 is operating in audio mode, the transmission manager 212 passively allows the mobile device 110 to transmit the audio signal from audio system 218 to laptop 130. The analog signal output from audio system 218 may pass through transmission manager 212 to transceiver 210.

Transceiver 210 and antenna 205 may be any combination of transceiver and antenna capable of transmitting digitized audio. For example, transceiver 210 may be a Bluetooth communication device, infrared device, or similar. Transceiver 210 may generate a digitized audio signal from audio received from the transmission manager 212. The digitized audio signal may be transmitted over audio link 20. In converting and transmitting the received audio to the digitized audio signal, transceiver 210 may employ a specific protocol for formatting the digitized audio signal, prior to transmission of the digitized audio signal. For example, transceiver 210 may employ an audio codec when converting analog audio to the digitized audio signal.

When the mobile device 110 is switched to operate in data-over-audio mode, either in response to user input or another trigger (e.g., a program needs to transmit data), digital data from data storage medium 220 may be converted to a data-over-audio tone sequence using a DAC 215. The data-over-audio tone sequence may, for example, be an analog audio tone sequence. Alternatively, the data-over-audio tone sequence may be a formatted digital audio tone sequence.

In data-over-audio mode, the transmission manager 212 becomes active and manages the transmission of data-over-audio tone sequences from DAC 215. When managing the transmission of the data-over-audio tone sequences, the transmission manager 212 may modify or add to the data-over-audio tone sequence by preceding and/or appending a notification or termination tone sequence to the transmission. These notification or termination tone sequences provide information regarding the tone sequence transmission and may be used by laptop 130 to properly receive and process the data-over-audio tone sequence transmission. The data-over-audio tone sequence may be input to transceiver 210 for conversion into a digitized audio signal and transmission to laptop 130, along with any preceding or appended tone sequences.

Transceiver 210 may be limited to the transmission of digitized audio over audio link 20, being restricted from transmitting non-audio digital data via a hardware or software restrictive means. For example, the input to transceiver 210 may be limited to analog or audio input. Therefore, by converting the digital data to an audio tone sequence, at DAC 215, and by providing the resulting tone sequence as input to transceiver 210, the example embodiment circumvents the limitations on transmitting digital data by transmitting the digital data in the form of a digitized audio signal using transceiver 210.

In an alternative embodiment, transceiver 210 may be limited to the input of audio data having a pre-defined format or formats (e.g., wave format, mp3, a proprietary format, etc.). In this alternative embodiment, the audio output of audio system 218 and DAC 215 may be in the form of digital audio having the pre-defined digital format. Alternatively, the transmission manager 212 may convert the output of audio system 218 or DAC 215 into the pre-defined format. Transceiver 210 may then convert the input audio data from the transmission manager 212 into a digitized form that is appropriate for transmission over audio link 20. This alternative embodiment similarly circumvents the limitations on transmitting digital data by transmitting the digital data in the form of a digitized audio signal using transceiver 210.

Laptop 130 may include a data storage medium 270, a DAC 265, a transmission manager 262, a transceiver 260, and antenna 255. Laptop 130 may operate in either audio mode, when receiving audio over audio link 20, or data-over-audio mode, when receiving digital data over audio link 20. The transmission manager may be a process, processor, or any other mechanism that can monitor and determine if the incoming transmission is audio or data-over-audio, and manage the transmission as necessary.

In laptop 130, the digitized audio signal, transmitted over audio link 20 from mobile device 110, may be received by antenna 255 and input into transceiver 260. Transceiver 260 may be a Bluetooth communication device, infrared device, or similar. In this case, antenna 255 may receive the digitized signal which is converted to audio tone sequences by transceiver 260. Transceiver 260 may then output the audio tone sequence or comparable analog signal to transmission manager 262. Furthermore or alternatively, transceiver 260 may be limited to the output of audio tones in the form of only an analog or audio output.

Transceiver 260 may provide the analog data-over-audio tone sequence to transmission manager 262. Transmission manager 262 may monitor incoming transmissions to determine if a given incoming transmission contains a data-over-audio tone sequence. For example, transmission manager 262 may monitor the incoming audio for a notification sequence, which may be followed by a data-over-audio tone sequence, or a termination sequence, which may indicate the end of a data-over-audio tone sequence. Based on the monitored incoming transmission, transmission manager 262 may operate in audio mode, wherein audio data is not routed to DAC 265, or in data-over-audio mode, wherein the incoming audio tone sequence is routed to DAC 265; DAC 265 may convert the data-over-audio tone sequence back into digital data. This digital data may then be stored in data storage medium 270.

In another embodiment, transceiver 260 may be limited to the output of audio data in a pre-defined format or formats (e.g., wave audio format, mp3 format, etc.). In this embodiment, transceiver 260 may convert and output the received digitized audio signal as digital audio data having the pre-defined format or formats, DAC 265 may then convert the audio data to the original digital data from storage medium 220.

One of ordinary skill will appreciate that the data transfer process employed to transfer data from mobile device 110 to laptop 130 may be unidirectional—operating in one direction (e.g., transferring data either to mobile device 110 from laptop 130 or from mobile device 110 to laptop 130)—or bidirectional (e.g., transferring data to mobile device 110 from laptop 130 and from mobile device 110 to laptop 130). Similarly, DAC 215 and DAC 265 may be bidirectional data converters, capable of converting a digital data set to audio tones and audio tones to a digital data set, or unidirectional data converters capable of exclusively converting a digital data set to audio tones or audio tones to a digital data set. In the case where the data converters are unidirectional, bidirectional data transmission may still be accomplished by having two unidirectional data converters, four total, at each end of audio link 20.

One of ordinary skill will appreciate that the data transfer process employed to transfer data from mobile device 110 to laptop 130 may be implemented using various approaches. For example, data may be streamed from DAC 215 through transceiver 210 onto audio link 20, or transceiver 210 may wait until the entire data set has been converted to a data-over-audio tone sequence before converting the entire data-over-audio tone sequence to a digitized audio signal and transmitting the digitized audio signal over audio link 20. Similarly, the data-over-audio tone sequence may be converted and streamed from transceiver 260 in real-time to DAC 265 as it is received, or transceiver 260 may wait until the entire digitized audio signal is received, prior to converting the digitized audio signal and outputting the data-over-audio tone sequence to DAC 265.

Figure 3:
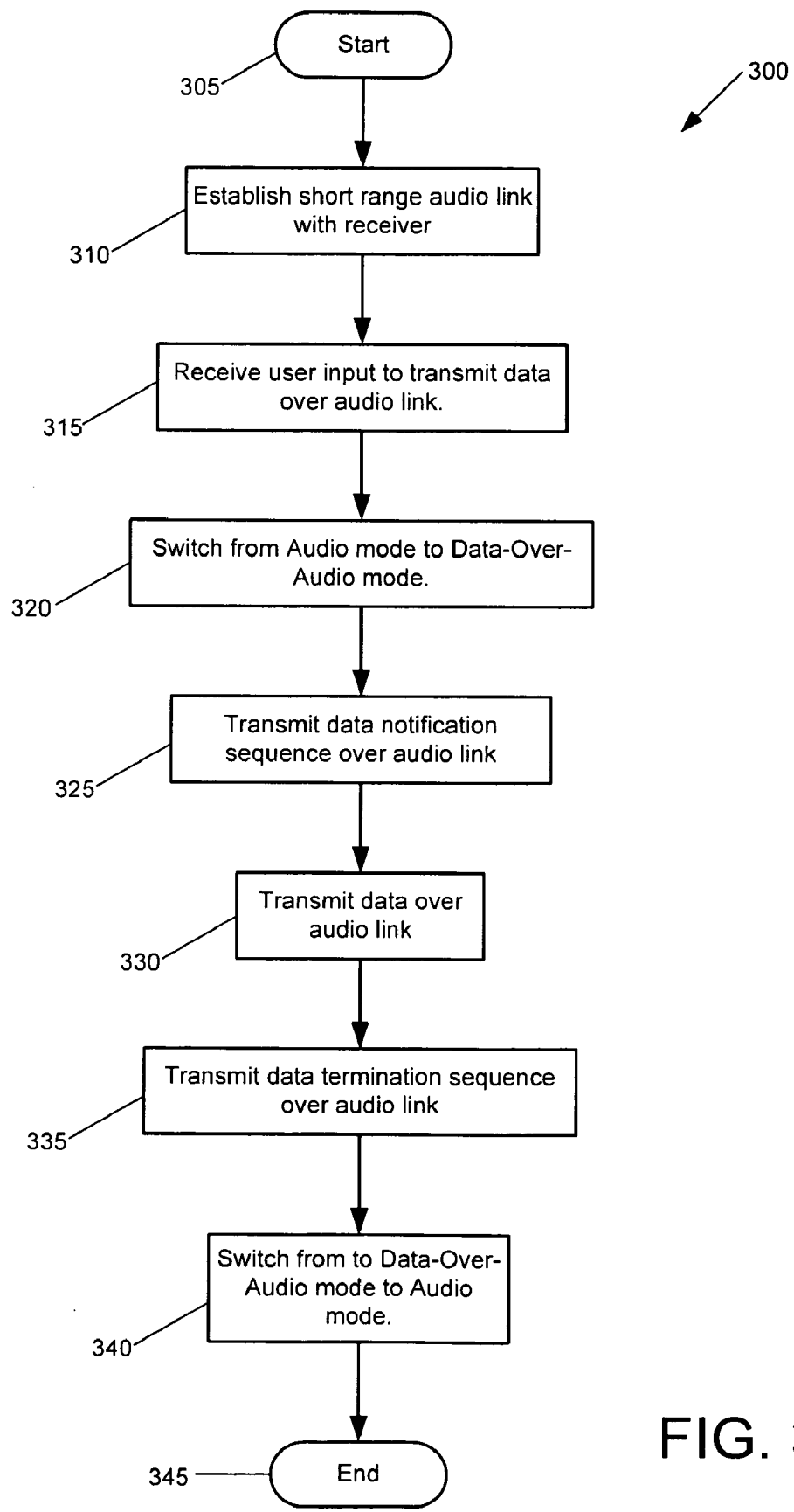
FIG. 3 is a flow diagram illustrating an example embodiment of a data-over-audio transmission process, in accordance with the present invention.

FIG. 3 is a flow diagram illustrating an example embodiment of a data-over-audio transmission process 300, in accordance with the present invention. Transmission process 300 may be performed by, for example, mobile device 110. While the foregoing exemplary transmission process 300 is explained with respect to mobile device 110, the transmission process 300 is not limited thereto. For example, transmission process 300 may be performed by any device that is a party to audio link 20.

The transmission process begins at step 305, during which mobile device 110 may be set to audio mode.

At step 310, mobile device 110 may establish a wireless, short-range, audio link 20 with another device, such as laptop 130. In the example embodiment, the audio link 20 may be limited to the transmission of digital audio tones or audio data, which have been converted to digitized audio signals.

At step 315, mobile device 110 may receive instructions to transmit digitally stored data, from storage medium 220, over audio link 20. The instructions may be received from the user of the mobile device, for example, via a user interface. Alternatively, mobile device 110 may receive instructions over a cellular network, or from an application or component within mobile device 110, to transmit data over audio link 20.

At step 320, mobile device 110 may switch from operating in audio mode to operating in data-over-audio mode. The mode of operation may be managed by transmission manager 212, or another component of mobile device 110.

At step 325, in response to or after the switch into data-over-audio mode, mobile device 110 may transmit a notification sequence over audio link 20 to laptop 130. The notification sequence may be a tone sequence notifying laptop 130 that the upcoming tone sequence is a data-over-audio mode transmission.

At step 330, mobile device 110 may transmit a data-over-audio tone sequence representing a data set over audio link 20 to laptop 130. The data-over-audio tone sequence may be generated by DAC 215, in response to the data set from data storage medium 220.

At step 335, after the successful transmission of the data-over-audio tone sequence, the mobile device 110 may transmit a termination sequence. The termination sequence may be a tone sequence indicating that mobile device 110 has completed the data-over-audio transmission. Alternatively or furthermore, the termination sequence may indicate that the mobile device 110 will be switching from data-over-audio mode to audio mode.

At step 340, mobile device 110 may switch from data-over-audio mode to audio mode. Thereafter, the process ends at step 345.

Figure 4:
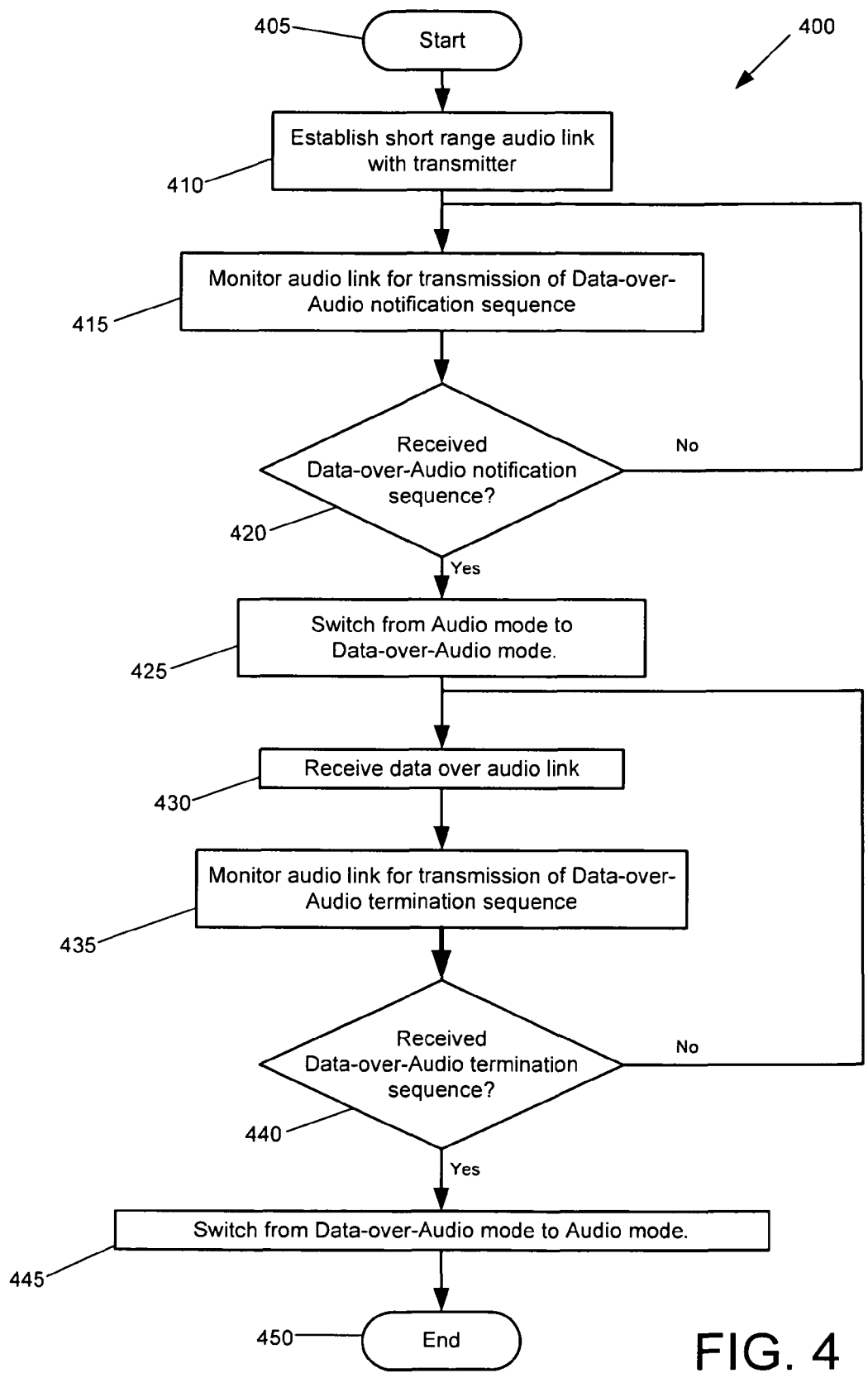
FIG. 4 is a flow diagram illustrating an example embodiment of a data-over-audio receiving process, in accordance with the present invention.

FIG. 4 is a flow diagram illustrating an example embodiment of a data-over-audio receiving process 400, in accordance with the present invention. Receiving process 400 may be performed by, for example, laptop 130. One of ordinary skill will appreciate that while the example embodiment makes reference to laptop 130, laptop 130 is simply symbolic of any device capable of wireless, short-range communication with mobile device 110.

The transmission process begins at step 405. At step 405, mobile device 110 may be set to audio mode.

At step 410, laptop 130 may establish a wireless, short-range, audio link 20 with another device, such as mobile device 110. In the example embodiment, audio link 20 may be limited to the transmission of audio tones or audio data which have been converted to digitized audio signals.

At step 415, laptop 130 may monitor audio link 20 for an indication that the mobile device 110 has switched from audio mode to data-over-audio mode. In one example embodiment, the transmission manager 262 may monitor the output of transceiver 260 for a notification sequence. The notification sequence may indicate a mode switch by mobile device 110, or that a data transmission is beginning.

At step 420, laptop 130 may determine if a received tone sequence is a notification sequence. If the received tone sequence is not a notification sequence, laptop 130 may continue to monitor audio link 20. While monitoring audio link 20 for a notification sequence, any audio tones are allowed to pass through to other applications on laptop 130. If the received tone sequence is a notification sequence, process 400 may proceed to step 425. At step 425, laptop 130 may switch from operating in audio mode to operating in data-over-audio mode. The mode of operation may be managed by the transmission manager 212 or another component of laptop 130.

At step 430, laptop 130 may receive a data-over-audio tone sequence from mobile device 110. Laptop 130 may stream this data to DAC 265 as the transmission continues. Alternatively, laptop 130 may cache or store the data-over-audio tone sequence until a termination sequence is received, and thereafter input the data-over-audio tone sequence to DAC 265 for processing and conversion into digital data.

At step 435, or synchronously with step 430, laptop 130 may monitor the audio link 20 for a termination sequence indicating the conclusion of the data transmission.

At step 440, if laptop 130 does not receive the termination sequence, then laptop 130 continues to collect data-over-audio tones over audio link 20. If laptop 130 does receive the termination sequence, then laptop 130 continues to step 445.

At step 445, laptop 130 may switch from data-over-audio mode to audio mode.

At step 450, the process completes, leaving laptop 130 in audio mode. Furthermore, steps may be taken to sever audio link 20.

Figure 5:
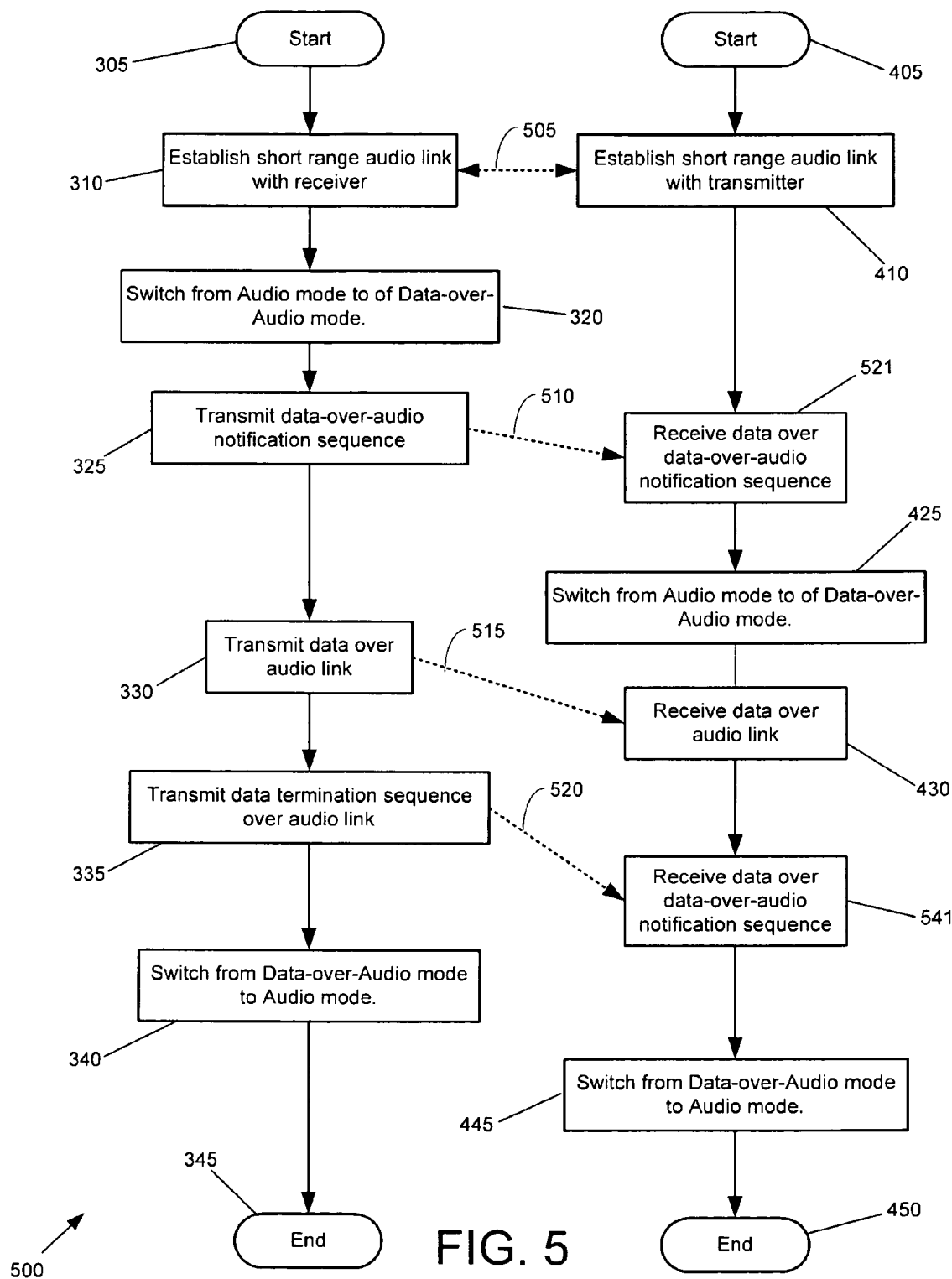
FIG. 5 is a flow diagram illustrating an exemplary unidirectional data transmission process, in accordance with the present invention.

FIG. 5 is a flow diagram of an exemplary unidirectional data transmission process 500 which illustrates steps and interactions between mobile device 110 and laptop 130. Data transmission process 500 illustrates the interaction between process 300 and process 400. While steps may have been added or removed for brevity and simplicity, one of ordinary skill will be able to understand the relationship between transmission process 500 and processes 300 and 400. For brevity, the relevant steps in processes 300 and 400 are similarly numbered in transmission process 500. Therefore, only the new features and steps exemplified in FIG. 5 will be explained.

In unidirectional data transmission process 500, a bi-directional dashed line 505 connects step 310 and step 410. Bidirectional dashed line 505 represents active two-way communication between the mobile device 110 and laptop 130 to establish audio link 20. This communication may include any protocol steps necessary to establish the audio link 20.

At step 325, mobile device 110 may transmit a notification sequence over audio link 20 to laptop 130. The transmission of the notification sequence is illustrated by unidirectional dashed line 510. Unidirectional dashed lines represent one-way communication between mobile device 110 and laptop 130 over audio link 20. The notification sequence is received at laptop 130 at step 521. Step 521 incorporates step 420, along with actual receipt of a notification sequence. Upon receiving the notification sequence, laptop 130 switches to data-over-audio mode in step 425.

At step 330, mobile device 110 may transmit a data-over-audio tone sequence over audio link 20 to laptop 130. The data-over-audio tone sequence transmission is represented by unidirectional dashed line 515. This tone sequence is received by laptop 130 at step 430.

At step 335, after the successful transmission of the data-over-audio tone sequence, mobile device 110 may transmit a termination sequence. The transmission of the termination sequence is represented by unidirectional dashed line 520. The data termination sequence is received by laptop 130 at step 541. Step 541 incorporates step 440 and the actual receipt of the termination sequence.

At step 340, mobile device 110 may switch from data-over-audio mode to audio mode. Similarly, at step 445 the laptop switches from of data-over-audio mode to audio mode.

Figure 6:
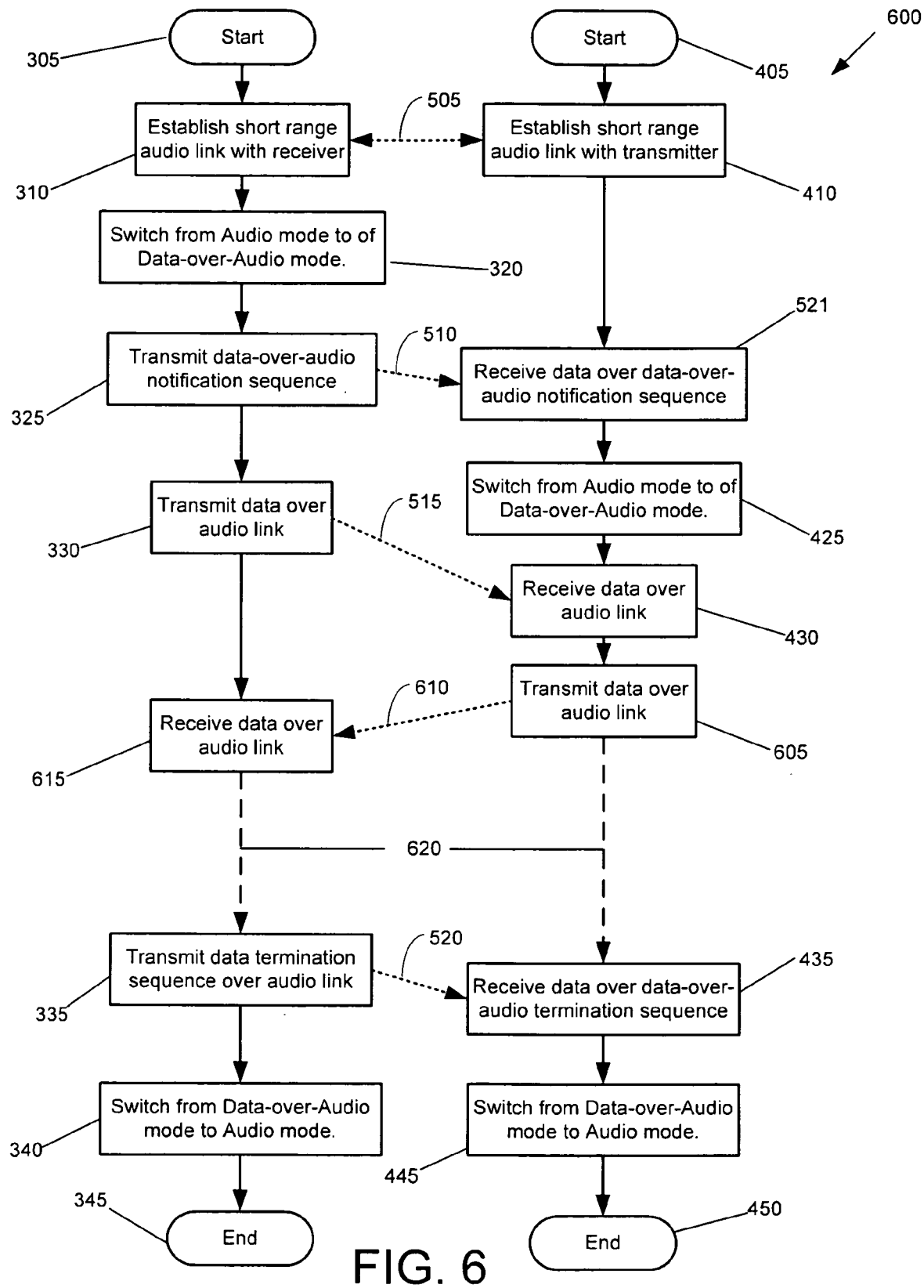
FIG. 6 is a flow diagram illustrating an exemplary bidirectional data transmission process, in accordance with the present invention.

FIG. 6 is a flow diagram of an exemplary bidirectional data transmission process 600 which illustrates alternative steps and interactions between mobile device 110 and laptop 130. Data transmission process 600 illustrates a data transmission process that is similar to data transmission process 500, except that data transmission process 600 includes bidirectional data transmissions. While steps may have been added or removed for brevity and simplicity, one or ordinary skill will be able to understand the relationship between transmission process 600 and processes 300, 400, and 500. For brevity, the relevant steps in processes 300, 400, and 500, are similarly numbered in transmission process 600. Therefore, only the new features exemplified in FIG. 6 will be explained.

In bidirectional data transmission process 600, unidirectional dashed line 610 connects step 605 and step 615. Unidirectional dashed line 610 represents a data-over-audio tone sequence transmission from laptop 130 to mobile device 110. This transmission follows dashed line 515 from mobile device 110 to laptop 130. Step 605 and step 615 are comparable to steps 330 and 430, respectively. Combined, steps 330, 430, 605, and 615 illustrate bidirectional data transmission between mobile device 110 and laptop 130.

Dashed lines 620 illustrate continued data-over-audio transmission between mobile device 110 and laptop 130 in either direction. These transmissions may continue until either mobile device 110 or laptop 130 transmits a termination sequence, thereby ending data-over-audio transmissions. Therefore, while process 600 shows a termination sequence issued by mobile device 110, in alternative embodiments, the termination sequence may be initiated by laptop 130.

One of ordinary skill will appreciate that while processes 300, 400, 500, and 600 refer to the transmission of audio tones and audio sequences, the actual transmissions may be in the form of digitized audio signals. As set forth above, transceiver 210 and transceiver 260 may be Bluetooth communication devices, infrared communication devices, or similar. As such, transceiver 210 and transceiver 260 may communicate using digitized audio signals. In converting the audio tones to and from digitized audio signals, transceiver 210 and transceiver 260 may employ a specific protocol to convert the input audio tones to and from the digitized audio signals. Furthermore, transceiver 210 and transceiver 260 may be limited to the transmission of digitized audio signals over audio link 20.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Processes may also be implemented as computer-executable instructions (e.g., as one or more scripts), stored procedures, executable programs, etc. on a client, server, and/or database. In other words, the descriptions of processes herein are provided for the purpose of illustrating certain embodiments, and should in no way be construed so as to limit the claimed invention.

Therefore, while FIGS. 2A, 2B, 3, 4, 5, and 6 illustrate systems and methods including mobile device 110 and laptop 130, one of ordinary skill will appreciate that the invention is not limited thereto. For example, the present invention may apply to communications between any two or more devices capable of establishing an audio communication link. Accordingly, laptop 130 is simply exemplary of any personal computer, mobile device, appliance, or computing device capable of achieving an audio communication link with a device having the features of mobile device 110.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but instead with reference to the appended claims, along with the full scope of equivalents to which such claims are entitled. It is anticipated and intended that future developments will occur in the arts discussed herein, and that the mentioned systems and methods will be incorporated into such future embodiments. In sum, it should be understood that the invention is capable of modification and variation and is limited only by the following claims.

Computing devices (e.g., processors, clients, servers, terminals, etc.), such as those discussed herein generally may include executable instructions. Furthermore, processors may include any device itself containing any number of processing components, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. Computer-executable instructions may be compiled or interpreted from computer programs created using a variety of programming languages and/or technologies known to those skilled in the art, including, without limitation, and either alone or in combination, Java™, C, C++, assembly, etc. In general, a processor (e.g., a microprocessor), receives instructions (e.g., from a memory, a computer-readable medium, etc.), and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory.

Communications between computing devices, and within computing devices, may employ transmission media including coaxial cables, copper wire, and fiber optics, including the wires that comprise a system bus coupled to the processor. Transmission media may include or convey acoustic waves, light waves, and electromagnetic emissions, such as those generated during radio frequency (RF) and infrared (IR) data communications. Common forms of computer-readable media include, for example, floppy disks, flexible disks, hard disks, magnetic tapes, any other magnetic media, a CD-ROM, DVD, any other optical media, punch cards, paper tapes, any other physical media with patterns of holes, RAM, PROM, EPROM, FLASH-EEPROM, any other memory chips or cartridges, carrier waves as described hereinafter, or any other medium from which a computer can read.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disks, removable disks, a CD-ROM, or any other form of storage media known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

The invention claimed is:

1. A method for transmitting digital data over an audio communication link, comprising:
    establishing an audio communication link between a first communication device and a second communication device, the audio communication link being a wireless, short-range communication link for communicating audio tones between the first communication device and the second communication device;
    transmitting an audio notification sequence from the first communication device to the second communication device, wherein the second communication device switches from an audio mode to a data-over-audio mode after receiving the audio notification sequence and the first communication device switches from the audio mode to the data-over-audio mode prior to transmitting the audio notification sequence; and
    after both the first communication device and the second communication device have switched to the data-over-audio mode,
    converting a digital data set, at the first communication device, to an audio tone sequence using a first digital-audio data converter;
    converting the audio tone sequence, from the first digital-audio data converter, to a digitized audio signal;
    transmitting the digitized audio signal from the first device to the second device over the audio communication link;
    converting the digitized audio signal, at the second device, to the audio tone sequence; and
    converting the audio tone sequence, at the second device, to the digital data set using a second digital-audio data converter,
    wherein the audio tone sequence includes an appended termination tone sequence that indicates a completed data-over-audio transmission and that triggers the second communication device to switch from the data-over-audio mode to the audio mode.

2. The method of claim 1, wherein the audio tone sequence is an analog tone sequence.

3. The method of claim 1, wherein the audio tone sequence is represented in a first digital format and the digitized audio signal is represented in a second digital format.

4. The method of claim 3, wherein the first digital format differs from the second digital format.

5. The method of claim 1, wherein, after receiving the appended termination tone sequence, the second device switches from the data-over-audio mode to the audio mode.

6. The method of claim 1, wherein, prior to transmitting the appended termination tone sequence, the first device switches from the data-over-audio mode to the audio mode.

7. The method of claim 1, further comprising transmitting an audio termination sequence from the second communication device to the first communication device, after receiving a complete audio tone sequence.

8. The method of claim 1, wherein the first audio-digital data converter and the second audio-digital data converter are bi-directional data converters, capable of converting audio tones to digital data, and digital data to audio tones.

9. The method of claim 8, further comprising:
    converting a second digital data set at the second device to a second audio tone sequence using the second digital-audio data converter;
    converting the second audio tone sequence, from the second digital-audio data converter, to a second digitized audio signal;
    transmitting the second digitized audio signal from the second device to the first device over the communication link;
    converting the second digitized audio signal, at the first device, to the second audio tone sequence;
    converting the second audio tone sequence at the first device back to the second digital data set using the first digital-audio data converter.

10. The method of claim 1, wherein the audio communication link is limited to audio communication.

11. The method of claim 10, wherein the audio communication link is a Bluetooth communication protocol restricted to audio communication.

12. A system for transmitting data over an audio communication link, including a first communication device and second communication device, comprising:
    the first communication device, comprising;
        a first data storage medium;
        a first transceiver that converts an audio tone sequence to a digitized audio sequence and transmits the digitized audio signal from the first device to the second device over the audio communication link;
        a first digital-audio data converter that generates an audio tone sequence from digital data, the data converter having an input for receiving data from the data storage medium and an output for outputting the audio tone sequence, the output audio tone sequence corresponding to the received input data,
        wherein the first communication device transmits an audio notification sequence to the second communication device;
    the second communication device, comprising;
        a second data storage medium;
        a second transceiver that receives the digitized audio sequence from the first device over the audio communication link, and converts the digitized audio signal to the audio tone sequence;
        a second digital-audio data converter that generates the digital data corresponding to the audio tone sequence, the second digital-audio data converter having an output for outputting data to the data storage medium and an input for receiving the audio tone sequence from the second transceiver, the input audio tone sequence corresponding to output data; and the audio communication link being a wireless, short-range communication link for transmitting the digitized audio signal, wherein the first communication device and the second communication device each operate in either an audio mode or in a data-over-audio mode, such that the second communication device switches from the audio mode to the data-over-audio mode after receiving the audio notification sequence and the first device switches from the audio mode to the data-over-audio mode prior to transmitting the audio notification sequence, and wherein the audio tone sequence includes an appended termination tone sequence that indicates a completed data-over-audio transmission and that triggers the second communication device to switch from the data-over-audio mode to the audio mode.

13. The system of claim 12, wherein the audio tone sequence is an analog tone sequence.

14. The system of claim 12, wherein the audio tone sequence is represented in a first digital format and the digitized audio signal is represented in a second digital format.

15. The system of claim 14, wherein the first digital format differs from the second digital format.

16. The system of claim 12, after receiving the appended termination tone sequence, the second communication device switches from the data-over-audio mode to the audio mode.

17. The system of claim 12, prior to transmitting the appended termination tone sequence, the first communication device switches from the data-over-audio mode to the audio mode.

18. The system of claim 12, further comprising transmitting an audio termination sequence from the second communication device to the first communication device, after receiving a complete audio tone sequence.

19. The system of claim 12, wherein the first audio-digital data converter and the second audio-digital data converter are bi-directional data converters, capable of converting audio tones to digital data, and digital data to audio tones.

20. The system of claim 19, further wherein:
the second digital-audio data converter converts a second data set at the second device to a second audio tone sequence;
the second transceiver converts the second audio tone sequence to a second digitized audio signal, and transmits the second digitized audio signal from the second device to the first device over the communication link; and
the first transceiver converts the second digitized audio signal, at the first device, to the second audio tone sequence;
the first digital-audio data converter converts the second audio tone sequence, at the first device, back to the second data set.

21. The system of claim 12, wherein the first transceiver and second transceiver are limited to audio tone communications.

22. The system of claim 21, wherein the first transceiver and second transceiver are Bluetooth transceivers restricted to audio communications.

* * * * *